(12) United States Patent
Caliskan et al.

(10) Patent No.: US 8,925,991 B2
(45) Date of Patent: Jan. 6, 2015

(54) REINFORCED FRAME-TO-BODY ATTACHMENT

(75) Inventors: Ari Garo Caliskan, Canton, MI (US); John Edward Huber, Novi, MI (US); Michael M Azzouz, Livonia, MI (US); Satish Ganti, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 269 days.

(21) Appl. No.: 13/155,725

(22) Filed: Jun. 8, 2011

(65) Prior Publication Data
US 2012/0313399 A1 Dec. 13, 2012

(51) Int. Cl.
*B62D 27/06* (2006.01)
*B62D 25/20* (2006.01)
*F16B 5/02* (2006.01)

(52) U.S. Cl.
CPC .............. *B62D 27/065* (2013.01); *B62D 25/20* (2013.01); *F16B 5/02* (2013.01)
USPC ........................... 296/29; 296/30; 296/193.07

(58) Field of Classification Search
CPC ....... B62D 24/00; B62D 24/02; B62D 27/065
USPC ........................ 296/29, 193.07, 30, 35.1, 35.3
See application file for complete search history.

(56) References Cited

U.S. PATENT DOCUMENTS

| | | | | |
|---|---|---|---|---|
| 4,470,619 A | * | 9/1984 | Imajyo et al. | 296/29 |
| 4,861,182 A | * | 8/1989 | Gillet | 403/264 |
| 5,899,498 A | * | 5/1999 | Horton | 280/781 |
| 6,188,039 B1 | * | 2/2001 | Gass | 219/104 |
| 6,543,828 B1 | * | 4/2003 | Gass | 298/29 |
| 7,188,877 B2 | | 3/2007 | Gonzalez | |
| 7,393,015 B1 | * | 7/2008 | Gillespie et al. | 296/29 |
| 7,490,892 B2 | * | 2/2009 | Sato | 296/184.1 |
| 7,631,918 B2 | * | 12/2009 | Yasukouchi et al. | 296/30 |
| 2006/0138806 A1 | | 6/2006 | Arroupe | |
| 2008/0084093 A1 | * | 4/2008 | Kishima et al. | 296/203.03 |
| 2008/0253859 A1 | | 10/2008 | Johnson | |
| 2009/0121106 A1 | | 5/2009 | An | |
| 2009/0152034 A1 | * | 6/2009 | Takasaki et al. | 180/68.5 |
| 2010/0072787 A1 | * | 3/2010 | Abe et al. | 296/203.04 |
| 2011/0272969 A1 | * | 11/2011 | Mori | 296/193.07 |
| 2013/0049393 A1 | * | 2/2013 | Kurogi et al. | 296/30 |
| 2013/0229030 A1 | * | 9/2013 | Yamaguchi et al. | 296/193.07 |

FOREIGN PATENT DOCUMENTS

KR 552720 B1 * 12/2000

* cited by examiner

*Primary Examiner* — Jason S Morrow
(74) *Attorney, Agent, or Firm* — L.C. Begin & Associates, PLLC

(57) ABSTRACT

A reinforced frame structure for a vehicle is provided. The frame structure includes a frame portion having a first portion and a pair of wall portions extending therefrom. A first reinforcement is rigidly coupled to the wall portions, and the first portion, the wall portions, and first reinforcement combine to define an enclosure.

16 Claims, 7 Drawing Sheets

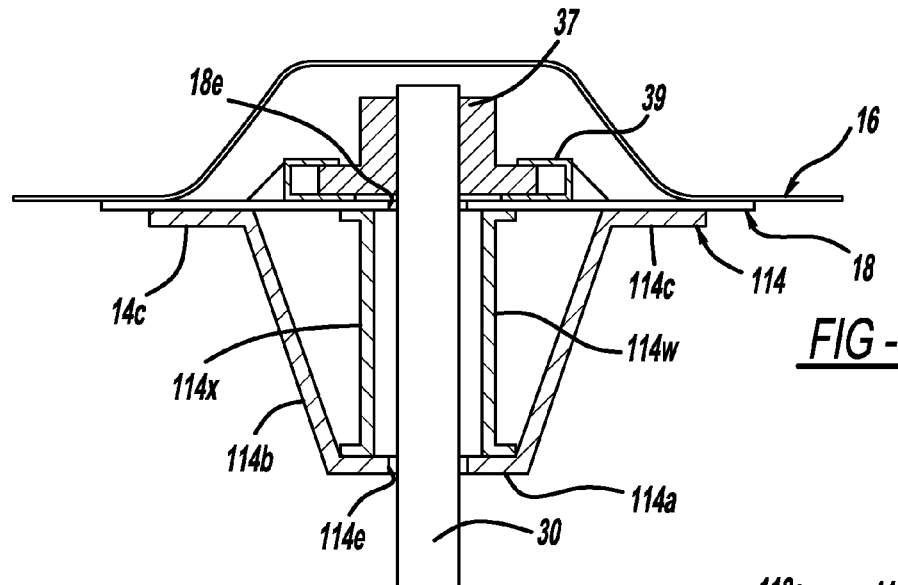
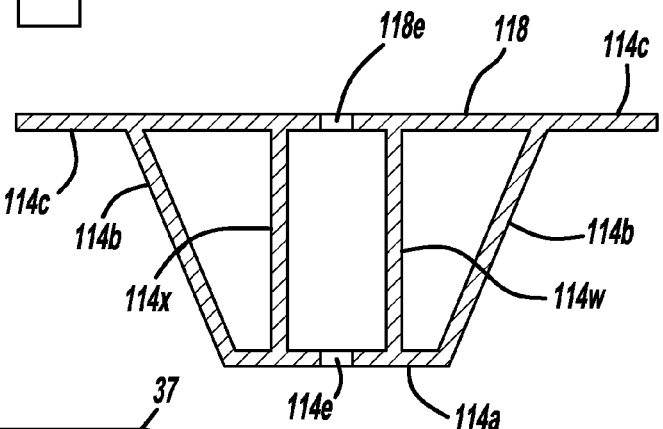
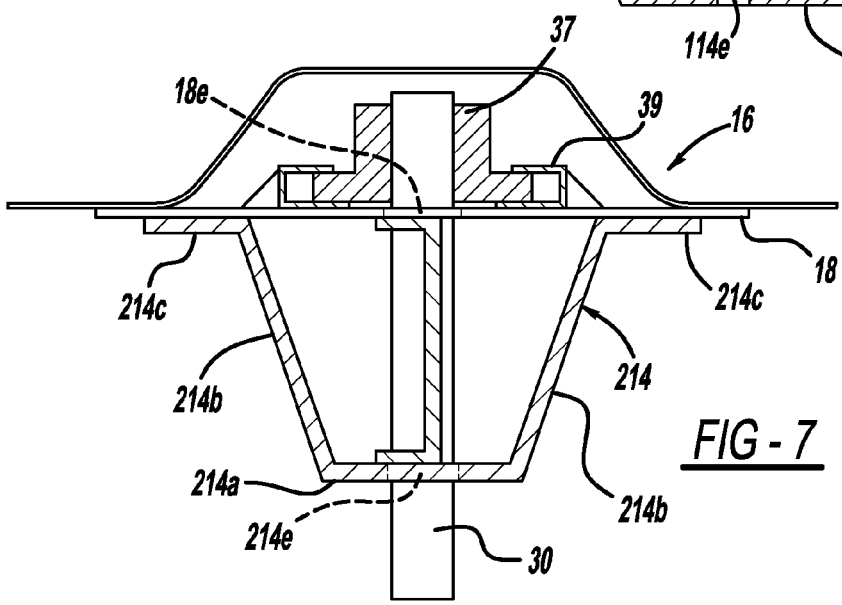

REINFORCED FRAME-TO-BODY ATTACHMENT

BACKGROUND OF THE INVENTION

The present invention relates to mechanisms for coupling components of a vehicle to a portion of a vehicle frame and/or body.

In vehicles incorporating a frame-mounted body structure, various methods are used to attach portions of the vehicle frame (for example, cross-members and the like) to the vehicle body. Other portions of the vehicle may also be coupled to the vehicle body via (or along) the frame portions attached to the body. For example, other portions of the vehicle may be attached to the frame portions via bolts or other suitable connection means.

It is desirable that the frame portions and/or any frame-to-body connection structures, or joints, have sufficient strength and stiffness to prevent excessive deflection or deformation of the frame responsive to loads applied through the connection means. In addition, in order to meet various vehicle performance and fuel economy targets, it is desirable to minimize the overall weight of the vehicle. The designs of metallic panels and other body components may be optimized so as to minimize the required thickness of the materials used. This design optimization, the increasing use of BIW ("body in white") structures, and the increasing use of composite and other relatively lighter-weigh materials all help to facilitate vehicle weight reduction. However, in order to fully exploit the benefits offered by such technologies, a need exists for frame structures and frame-to-body joint structures which provide the desired stiffness while minimizing the weight of such structures.

SUMMARY OF THE INVENTION

In one aspect the embodiments of the present invention, a frame structure for a vehicle is provided. The frame structure includes a frame portion having a first portion and a pair of wall portions extending therefrom. A first reinforcement is rigidly coupled to the wall portions, and the first portion, the wall portions, and first reinforcement combine to define an enclosure.

In another aspect the embodiments of the present invention, a frame-to-body joint structure for a vehicle is provided. The joint structure includes a first reinforcement rigidly coupled to a body portion of the vehicle so as to provide at least a portion of a path for transmission of a load from a load transmission means rigidly coupled to the first reinforcement, to the body portion.

In another aspect the embodiments of the present invention, a frame-to-body joint structure for a vehicle is provided. The joint structure includes a first reinforcement rigidly coupled to a frame portion of a vehicle and to a body portion of the vehicle so as to provide at least a portion of a path for transmission of a force from the frame portion to the body portion.

BRIEF DESCRIPTION OF THE DRAWINGS

FIG. 5 is a cross-sectional view of a reinforced frame structure in accordance with another embodiment of the present invention.

FIG. 6 is a cross-sectional view of a reinforced frame structure in accordance with another embodiment of the present invention.

FIG. 7 is a cross-sectional view of a reinforced frame structure in accordance with another embodiment of the present invention.

DETAILED DESCRIPTION

Figure 1:
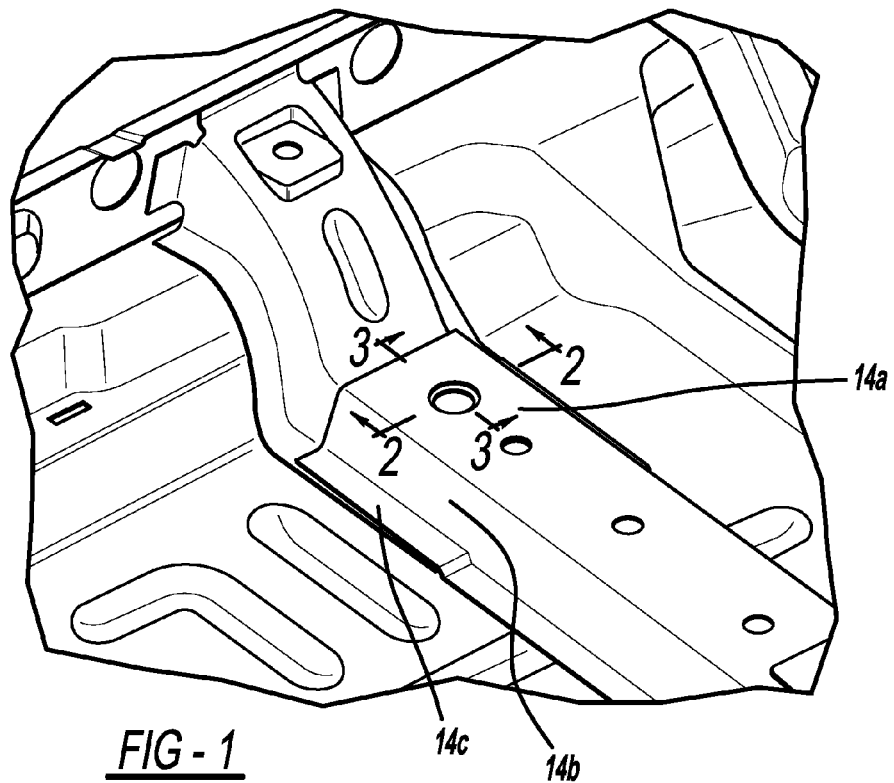
FIG. 1 is a perspective view of a reinforced frame structure in accordance with an embodiment of the present invention rigidly coupled to a vehicle body portion.

As used herein, the terms "joint" and "joint structure" are understood to include any elements by and through which a frame portion and a body portion are coupled together, including elements positioned between the frame portion and the body portion. The terms "joint" and "joint structure" are also understood to encompass any elements which are configured to provide a load path or part of a load path from a load transmission means to the body portion via the frame structure when the frame portion is rigidly coupled to the body portion and an element of the vehicle is attached to the vehicle through a load transmission means operatively coupled to the frame portion.

As used herein, components that are "rigidly coupled" together are understood to be coupled (using, for example, welds, rivets, adjustable fasteners (such as nuts and bolts), adhesives, etc.) so as to prevent or at least minimize movement of the components relative to each other, barring failure of the coupling mechanism.

As used herein, the term "frame structure" is understood to include the frame portion and any element rigidly coupled thereto prior to rigid coupling of the frame portion to the body. Generally, the frame structure is comprised of the frame portion plus one or more elements of an embodiment of a joint structure described herein.

As used herein, the term "load transmission means" is understood to refer to any means for transmitting a load to the frame structure and/or joint structure.

While the particular embodiments of the reinforced joint structures described herein relate to connections between a portion of a frame of the vehicle and a portion of the vehicle body, it is understood that reinforced joint structures having characteristics disclosed herein may be used to connect portions of the vehicle other than the frame and the body.

The embodiments of the frame structure and frame-to-body joint structure described herein enable the transmission of forces through the frame portion to a body portion attached to the frame portion. These forces may be transmitted to the frame portion via a load transmission means (comprising for example, a bolt and caged nut as described below) which enables attachment and retention of another portion of the vehicle (for example, a portion of the vehicle suspension) (not shown) to the frame portion. Then, forces exerted on the load transmission means by the other portion of the vehicle are transmitted via the load transmission means to the frame structure and via the frame structure to the attached body portion.

Embodiments of the frame-to-body joint structure described herein are reinforced so as to stiffen the joint structure, to aid in minimizing deformation of the joint structure components and frame portion responsive to the forces transmitted through the joint. In addition, the load transmission means may be adjustable no as to enable its incorporation into body-to-frame joints having different configurations and dimensions, and to facilitate the attachment of any of a variety of vehicle components to the vehicle at the joint.

To realize the benefits of the reinforcements described herein while minimizing the weight added to the vehicle, reinforcement of the frame structure and/or frame-to-body joint structure may be localized to portions of the frame or joint residing at and/or near the region where forces are transmitted to the frame structure and connected body portions. This focuses the effects of the reinforcements on portions of the frame or joint where they are most needed, while enabling the sizes of the reinforcing elements and their contributions to vehicle weight to be minimized. For example, suitably-sized first and second reinforcements as described herein may be welded or otherwise suitably attached to associated frame portions and/or body portions to produce a locally-reinforced cross section. In other examples, where at least a portion of the joint structure is formed by an extrusion (as described in greater detail below), localization of the reinforcement may be achieved by cutting to a desired length a section of the extrusion and welding or otherwise suitably attaching the cut section to an unreinforced part of the frame portion and/or body portion, in a manner known in the art.

The specific material thicknesses and overall dimensions of the reinforcements and the materials from which the reinforcements are formed may be specified according to the requirements of a particular application.

Figure 2:
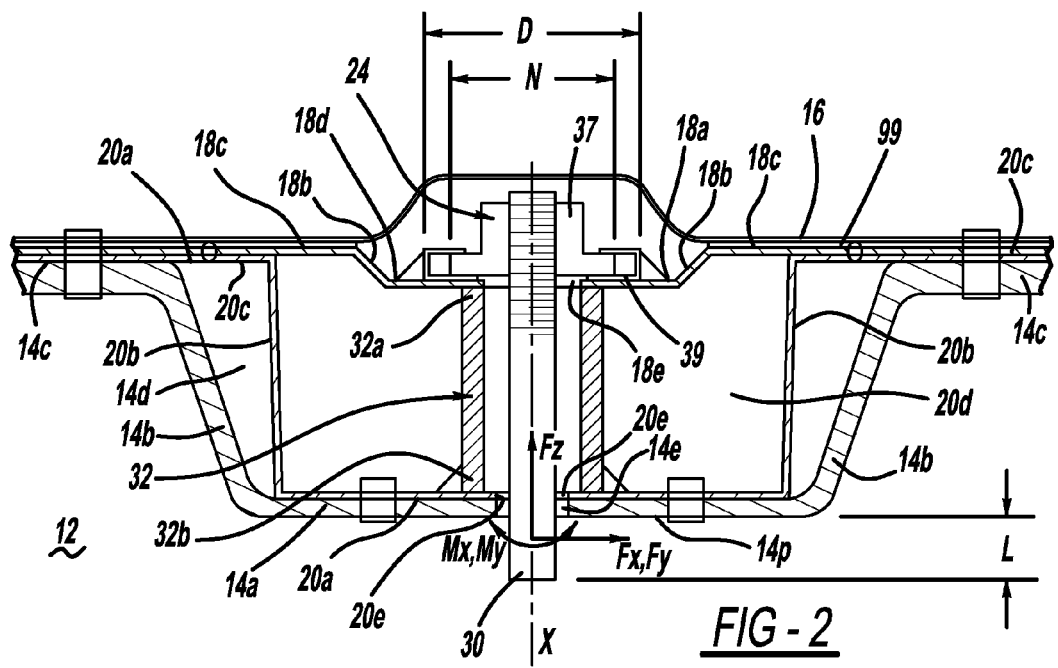
FIG. 2 is a cross-sectional side view of a reinforced frame-to-body joint structure in accordance with an embodiment of the present invention, taken along section 2-2 of FIG. 1.
Figure 3:
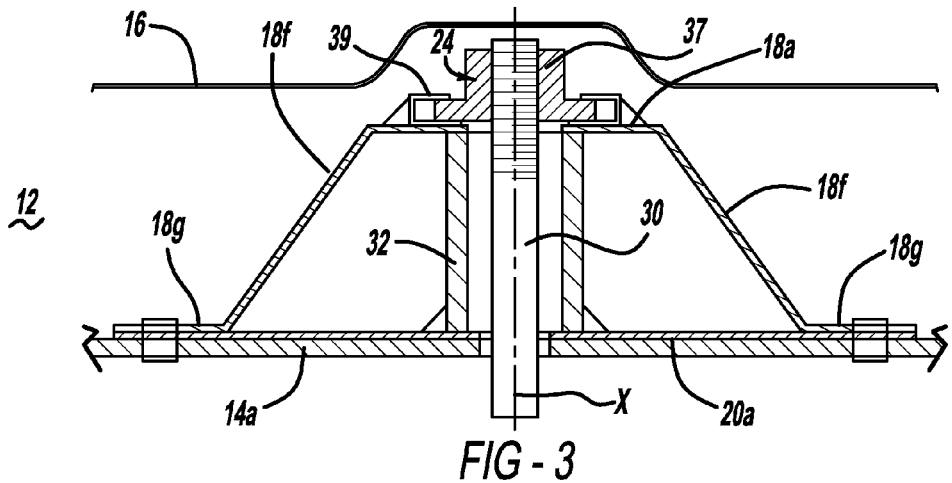
FIG. 3 is a cross-sectional side view of a reinforced frame-to-body joint structure in accordance with an embodiment of the present invention, taken along section 3-3 of FIG. 1.

FIGS. 1-3 are perspective and cross-sectional views showing a reinforced joint structure in accordance with one embodiment of the present invention, for attaching a portion of a frame of a vehicle (generally designated 14) to a portion of the body of the vehicle (generally designated 16). In the embodiment shown in FIGS. 1-3, the vehicle body portion comprises a floor panel and the vehicle frame portion comprises a cross-member extending laterally across at least a portion of the width of the vehicle and attached to the frame portion. However, embodiments of the joint structure described herein may be applied to connect any vehicle frame portions to associated body portions having suitable configurations.

In the embodiment shown in FIGS. 1-3, frame portion 14 has a substantially planar first portion 14a and wall portions 14b rigidly coupled to and extending from opposite ends of (and out of a plane of) the first portion 14a. Each of wall portions 14b includes and terminates in a second portion 14c configured for attachment to another element of the joint structure by welding or any other suitable method. Frame portions 14a and 14b combine to define a cavity 14d configured for receiving therein elements of the various embodiments of the attachment mechanisms and joint structures described herein. In the embodiment shown in FIGS. 1-3, first portion 14a and wall portions 14b are formed integrally with each other, as a single piece. However, the elements of the frame portion may alternatively be formed from separate parts which are rigidly coupled together.

In the embodiment shown in FIGS. 1-3, an opening 14e is provided in first portion 14a to permit extension of a bolt 30 or other portion of a suitable load transmission means through the frame portion, to enable mounting of other component(s) to the vehicle proximate the frame-body joint structure. Opening 14e may be sized so as to permit the position of bolt 30 extending through the opening to be varied within the opening, according to the degree of alignment of the centers of openings 14e, 20e (in second reinforcement 20, described below), and 18e (in first reinforcement 18, also described below). This sizing of opening 14e facilitates compensation for misalignment of the above-mentioned openings.

Frame portion 14 may be formed using any suitable process or processes. Frame portion 14 may be formed from a metallic material, a polymer material, or any other material or combination of materials suitable for the applications and attachment mechanisms and methods described herein. Examples of suitable metallic materials include steel, aluminum, and magnesium. Examples of other suitable materials include laminates and carbon fiber materials.

In a particular embodiment, body portion 16 is part of a BIW ("body in white") assembly. As used herein, the terms "BIW" and "body in white" refer to an assemblage of body panels welded or otherwise suitably joined together into a single unit or vehicle substructure prior to priming and painting. Various panels may be combined to form associated substructures (for example, underbody, front end, and body side substructures) which, in combination and when attached to the vehicle frame, form the body of the vehicle.

In the embodiments described herein, the BIW structure is mounted to the vehicle frame using one or more of the body-to-frame joint structure embodiments described herein, thereby providing a frame-mounted body structure. However, the joint structure embodiments described herein may also be used to attach individual body panels to individual vehicle frame members.

In the particular embodiment shown in FIGS. 1-3, body portion 16 is a floor panel. Body portion 16 may be formed using any suitable process or processes. Body portion 16 may be formed from a metallic material, a polymer material, or any other material or combination of materials suitable for the applications and attachment mechanisms and methods described herein. Examples of suitable metallic materials include steel, aluminum, and magnesium. Examples of other suitable materials include laminates and carbon fiber materials.

In the embodiment shown in FIGS. 1-3, a first reinforcement 18 is rigidly coupled to wall portions 14b of frame portion 14, thereby forming a rigid enclosure defined by first portion 14a, wall portions 14b, and first reinforcement 18 and maximizing the stiffness of the resulting assembly. When secured in this manner, the first reinforcement increases the stiffness of the frame structure and the stiffness of the frame-to-body joint cross-section shown in FIGS. 1-3 responsive to loading on the body-frame joint.

In the embodiment shown in FIGS. 1-3, first reinforcement 18 includes a substantially planar first portion 18a and first wall portions 18b rigidly coupled to and extending from opposite ends of (and out of a plane of) the first portion 18a. Each of wall portions 18b includes and terminates in a second portion 18c configured for attachment to body portion 16 and to another element of the joint structure by welding or any other suitable method. First reinforcement portions 18a and 18b combine to define a cavity or recess 18d configured for mounting therein a portion of a load transmission means (generally designated 24 and described below). In the embodiment shown in FIGS. 1-3, the elements of first reinforcement are formed integrally with each other, as a single piece. However, the elements of the first reinforcement may alternatively be formed from separate parts which are rigidly coupled together.

Figure 3A:
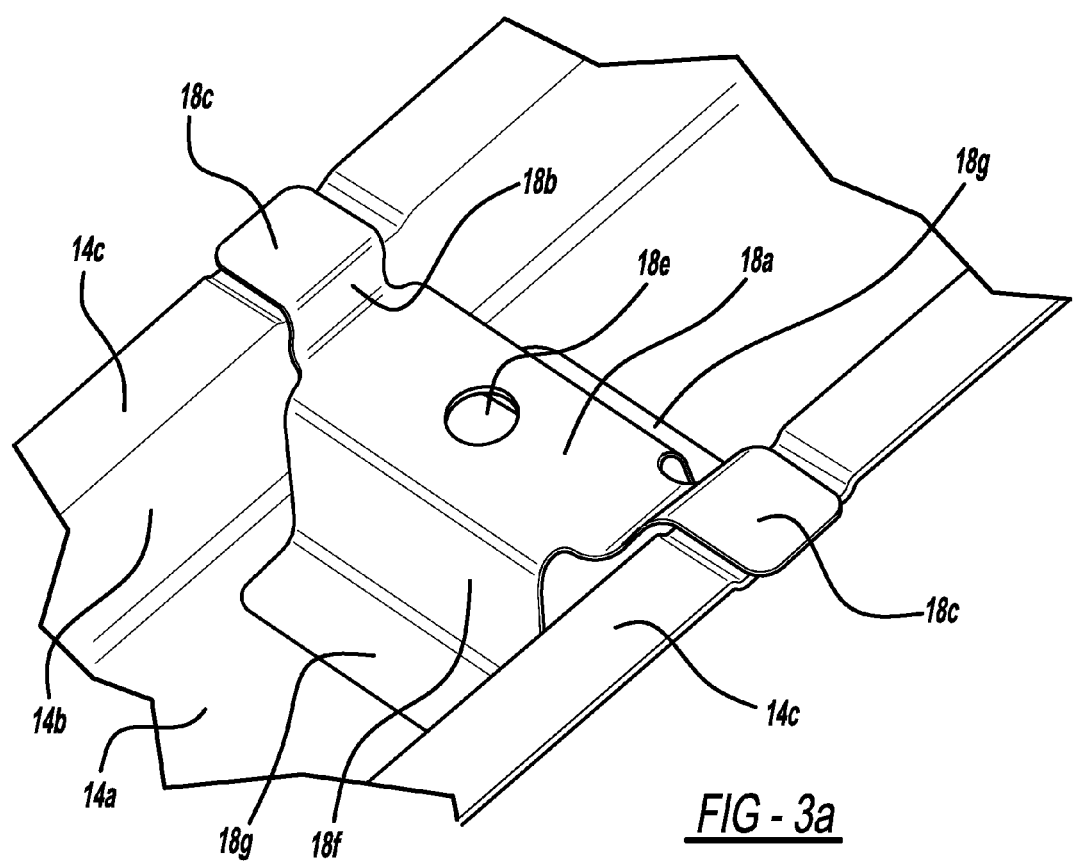
FIG. 3a is a perspective view of a first reinforcement in position as secured on a frame portion in accordance with an embodiment of the present invention.

In addition, as seen in FIGS. 3 and 3a, a pair of second wall portions 18f extends from edges of first portion 18a and first wall portions 18b. Second wall portions 18f extend toward second reinforcement second portions 20c (described below). Each of second wall portions 18f terminates in an associated third portion 18g which extends along and is secured to an associated second reinforcement second portion 20c. An opening 18e is provided in recessed first portion 18a to permit extension of bolt 30 or other element through the first portion, to enable mounting of other component(s) to the vehicle proximate the frame-body joint structure. Opening 18e may be sized so as to permit the position of bolt 30 extending through the opening to be varied within the opening, according to the degree of alignment of the centers of openings 14e, 18e, and 20e, as previously described. This sizing of opening 18e aids in compensating for misalignment of the above-mentioned openings. In alternative embodiment, the recess 18d may be omitted from the first reinforcement 18.

First reinforcement 18 may be formed using any suitable process or processes first reinforcement 18 may be formed from a metallic material, a polymer material, or any other material or combination of materials suitable for the applications and attachment mechanisms and methods described herein. Examples of suitable metallic materials include steel, aluminum, and magnesium. Examples of other suitable materials include laminates and carbon fiber materials.

In the embodiment shown in FIGS. 1-3, second reinforcement 20 includes a substantially planar first portion 20a and wall portions 20b rigidly coupled to and extending from opposite ends of (and out of a plane of) the first portion 20a. Each of wall portions 20b includes and terminates in a second portion 20c configured for attachment to another element of the joint structure by welding or any other suitable method. Second reinforcement portions 20a and 20b combine to define a cavity 20d configured for receiving therein elements of the various embodiments of the attachment mechanism described herein. In the embodiment shown in FIGS. 1-3, first portion 14a and wall portions 14b are formed integral with each other. However, the elements of the frame portion may alternatively be formed from separate parts which are rigidly coupled together.

In the embodiment shown in FIGS. 1-3, an opening 20e is provided in first portion 20a to permit extension of bolt 30 or other element through the second reinforcement first portion, to enable mounting of other component(s) to the vehicle proximate the frame-body joint structure. Opening 20e may be sized so as to permit the position of bolt 30 extending through the opening to be varied within the opening, according to the degree of alignment of the centers of openings 14e, 18e, and 20e. This sizing of opening 20e aids in compensating for misalignment of the above-mentioned openings.

Second reinforcement 20 may be formed using any suitable process or processes. Second reinforcement 20 may be formed from a metallic material, a polymer material, or any other material or combination of materials suitable for the applications and attachment mechanisms and methods described herein. Examples of suitable metallic materials include steel, aluminum, and magnesium. Examples of other suitable materials include laminates and carbon fiber materials.

In alternative embodiments, second reinforcement 20 is omitted from the joint structure and first reinforcement 18 is welded or otherwise suitably attached directly to frame portion 14.

Referring again to the embodiment shown in FIGS. 1-3, an annular spacer 32 is positioned between first reinforcement 18 and second reinforcement 20. In a particular embodiment, spacer 32 is rigidly coupled to a surface of second reinforcement first portion 20a using welding or any other suitable method.

Spacer 32 has a first end 32a which provides a bearing surface against which first reinforcement first portion 18a presses when another portion of the vehicle is coupled to the frame portion via the load transmission means 24 (described below). Spacer 32 also has a second end 32b opposite first end 32a which provides a bearing surface against which second reinforcement first portion 20a presses when another portion of the vehicle is coupled to the frame portion via the load transmission means 24. That is, when an element of the vehicle (not shown) is positioned proximate an embodiment of the reinforced frame-body joint described herein, and secured to the vehicle using the load transmission means, first reinforcement first portion 18a bears against spacer first end 32a, and second reinforcement first portion 20a bears against spacer second end 32b.

In the embodiment shown in FIGS. 1-3, spacer 32 is configured and positioned so as to enclose a bolt 30 forming part of the load transmission means 24. Although the embodiment of the spacer shown in FIGS. 1-3 is annular, the spacer may have any alternative configuration suitable for the requirements of a particular application.

Spacer 32 may be formed using any suitable process or processes. Spacer 32 may be formed from a metallic material, a polymer material, or any other material or combination of materials suitable for the applications and attachment mechanisms and methods described herein. Examples of suitable metallic materials include steel, aluminum, and magnesium. Examples of other suitable materials include laminates and carbon fiber materials.

In alternative embodiments, second reinforcement 20 is omitted, and spacer 32 is welded or otherwise suitably attached to frame portion 14.

In the embodiments of the reinforced frame-to-body joint described herein, any of a variety of methods may be used to rigidly couple components of the reinforced joint to each other. The coupling method (or methods) used may depend on the types of materials from which the components are formed, the geometries of the components, and other pertinent factors. Examples of suitable coupling methods include adjustable mechanical fasteners (such as screws, bolts, etc.), adhesives, welding, riveting, ultrasonic bonding, and any other suitable method or combination of methods.

A load transmission means 24 used in conjunction with the joint structure embodiments described herein may be adjustable so as to enable its incorporation into body-to-frame joints structures having any of a variety of different configurations and dimensions, and to facilitate the attachment of any of a variety of vehicle components to the vehicle at the joint. The load transmission means 24 enables attachment of an element of the vehicle to the vehicle proximate the reinforced frame-body joint, and also transmits forces from the connected element of the vehicle to the joint.

Load transmission means 24 is provided to couple the other portion of the vehicle to the frame portion 14 and to transmit loads from the connected other portion of the vehicle to the joint structure. In the embodiment shown in FIGS. 1-3, load transmission means 24 comprises a caged nut assembly 36 and bolt 30. The general structure of caged nut assemblies is well-known in the art. Assembly 36 includes a nut 37 and a cage 39. Nut 37 includes an opening 37a with threads 37b formed therein. Cage 39 is welded or otherwise suitably attached to first portion 18a of first reinforcement 18.

Bolt 30 has external threads 30a configured for engaging complementary internal threads formed along opening 37a of nut 37. In a manner known in the art, cage 39 encloses at least a portion of nut 37 so as to restrict rotation of the nut responsive to rotation of bolt 30 within opening 37a to engage threaded portions 37b and 30a. Thus, the cage rotationally secures the nut, enabling the bolt to be tightened on the nut by rotating the bolt and engaging threads 30a with nut threads 37b. In addition, when secured to a portion of the vehicle (for example, by welding), cage 39 secures to nut to the portion of the vehicle to prevent loss of the nut.

The cage 39 also aids in maintaining the nut in a position suitable for engagement by bolt 30 when the bolt is applied to the joint assembly. Also, cage 39 is dimensioned with respect to nut 37 so as to provide a lateral clearance d, generally along a plane perpendicular to a bolt insertion axis X. This enables the out to shift its lateral position within the cage. In the embodiment shown in FIGS. 1-3, the minimum value of clearance d is equal to a minimum internal dimension D of the cage minus a maximum external dimension N of the nut 37.

The load transmission means 24 is also adjustable in that the clearance d enables the position of the nut 37 to be adjusted to compensate for misalignment of the openings 14e, 18e, and 20e formed in frame portion 14, first reinforcement 18, and second reinforcement 20, respectively, and also misalignment of these openings with an opening formed in an element (not shown) of the vehicle which is to be attached to the vehicle using bolt 30.

The load transmission means may also be configured to permit adjustment of the length of the portion of the bolt 30 projecting from an outer surface 14p of frame portion 14a. Bolt 30 can be rotated such that a predetermined length L of the bolt projects beyond the frame portion outer surface 14p, to enable securement of another portion of the vehicle to the bolt. This enables the length of the projecting portion of the bolt to be adjusted according to the requirements of a particular application. If desired, rather than the caged nut and bolt just described, alternative types of load transmission means may be employed for the purposes described herein. In addition, in an embodiment where a bolt such as bolt 30 is used, an alternative securement means (such as a fixed welded nut or loose nut) may be used to secure the bolt instead of a caged nut.

In one particular embodiment, nut cage 39, spacer 32, frame portion 14, body portion 16, first reinforcement 18, and second reinforcement 20 are all formed from steel. One possible assembly sequence for this embodiment is shown in FIGS. 4a-4f. In this sequence, various components are rigidly coupled to the frame portion 14 to form a reinforced frame structure, generally designated 110. This frame structure is then rigidly coupled to body portion 16.

Figure 4A:
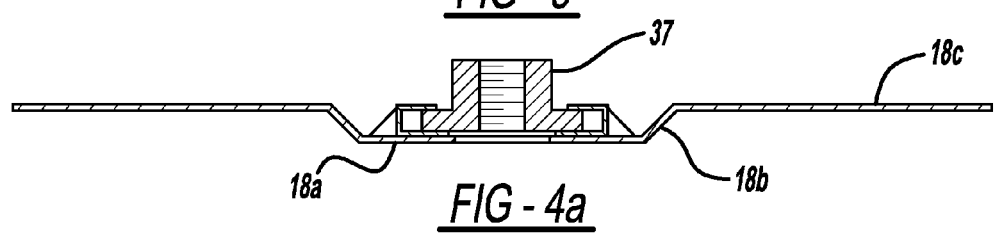
FIGS. 4a-4f are cross-sectional side views showing an assembly sequence of a reinforced frame structure and joint structure in accordance with an embodiment of the present invention.
Figure 4B:
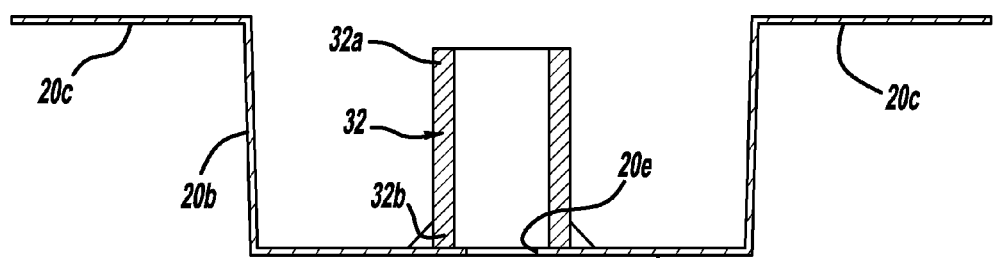
Figure 4C:
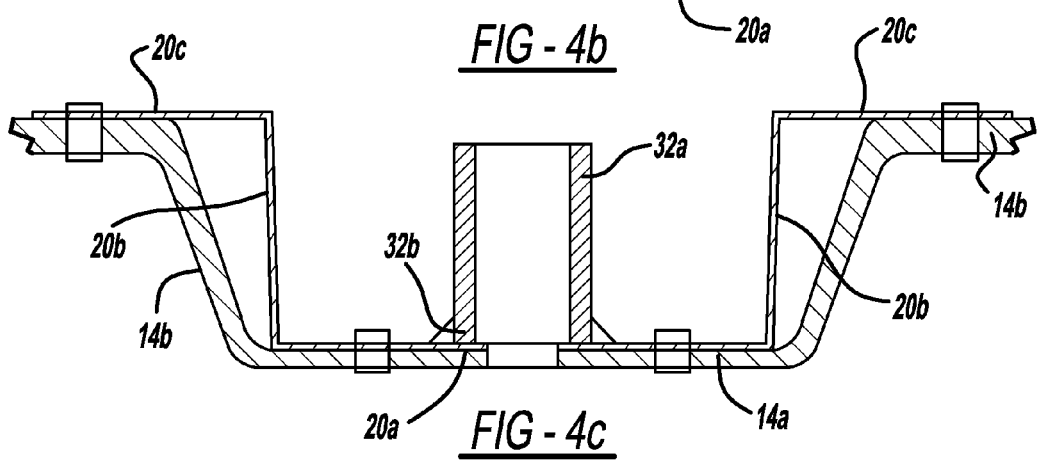
Figure 4D:
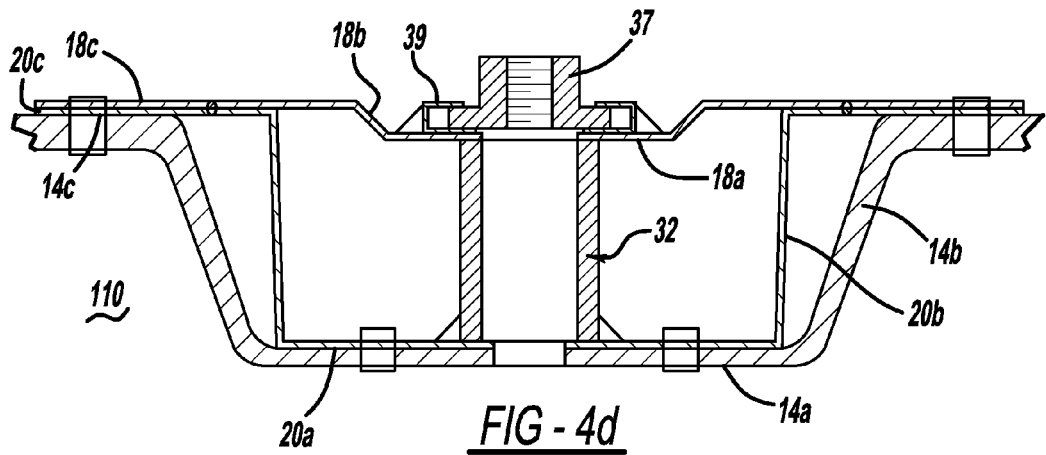
Figure 4E:
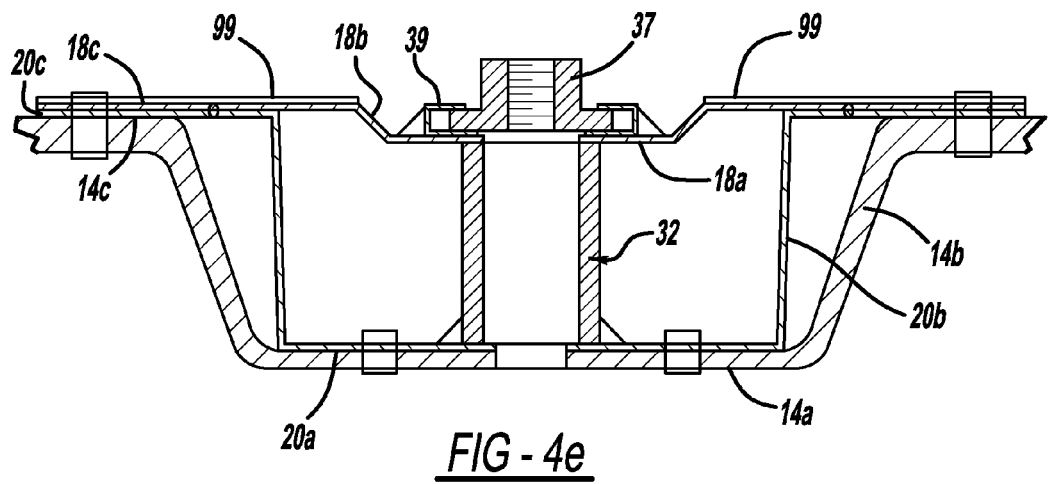
Figure 4F:
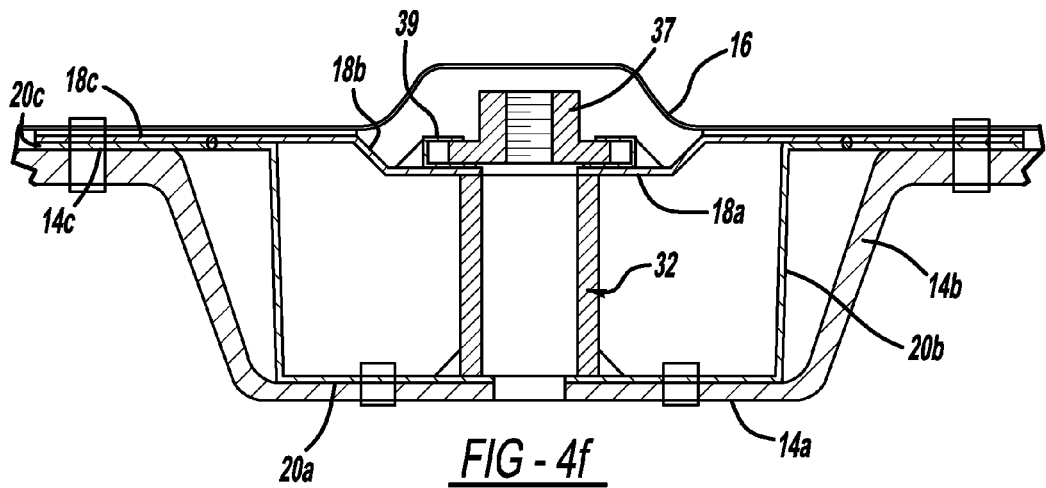

As seen in FIG. 4a, cage 39 containing nut 37 is welded or otherwise suitably attached to first reinforcement 18. Then, as seen in FIG. 4b, spacer 32 is welded or otherwise suitably attached to second reinforcement 20. Then, as seen in FIG. 4c, second reinforcement 20 is welded or otherwise suitably attached to frame portion 14. Then, as seen in FIG. 4d, first reinforcement 18 is welded or otherwise suitably attached to second reinforcement 20, thereby forming frame structure 110. As seen in FIG. 4e, an adhesive 99 may then be applied to an outer or exposed surface of first reinforcement 18, to fix the first reinforcement in position on body portion 16 prior to securing the first reinforcement to the body portion. Then, as seen in FIG. 4f, frame structure 110 is welded or otherwise suitably attached to body portion 16.

In another particular embodiment, frame portion 14 is formed from aluminum, while first reinforcement 18, second reinforcement 20, spacer 32, nut 36, and cage 39 are formed from steel. One possible assembly sequence for this embodiment is the same as the sequence previously described in relation to FIGS. 4a-4f, except that second reinforcement 20 is riveted to frame member 14 to provide a reinforced frame structure 200. Frame structure 200 is then riveted to body portion 16.

Loading of the joint structure will be discussed with reference to the embodiment shown in FIGS. 1-3. FIG. 2 shows various possible loadings on bolt 30, including moments $M_X$ and $M_Y$ and axial and transverse forces $F_X$, $F_Y$, and $F_Z$. Due to the coupling of bolt 30 to first reinforcement 18 via caged nut assembly 37, these loadings will generally produce reaction forces at the junction of caged nut 37 and first reinforcement 18. Forces will be transmitted through the first reinforcement to body portion 16, spacer 32, second reinforcement 20, and frame portion 14.

In addition, loads applied directly to the frame portion by the attached other portion of the vehicle will also be transmitted through the frame portion to the body portion via any couplings (i.e., welds, rivets, etc.) between the frame portion and the body portion, and will also be transmitted to other elements of the joint structure via the frame portion.

The elements of the frame-to-body joint structure are dimensioned, arranged with respect to each other, and coupled to each other such that, when another portion of the vehicle is coupled to the frame portion using the load transmission means 24, the elements of the joint structure (including first reinforcement 18, second reinforcement 20, and spacer 32), the frame portion 14, and the body portion 16 are pressed firmly against each other to form a rigid structure, with a view to preventing motion of these components with respect to each other. Thus, the elements of the joint form a rigid structure to which loading on the load transmission means is conveyed and through which this loading is transferred to the vehicle body. The elements of the joint provide additional material (aside from the frame portion and the body portion) through which the loads are distributed. The cross-sectional rigidity provided by the joint structure elements and the connections between these elements and the frame portion and body portion aid in minimizing deformation of the joint structure, the frame portion, and the body portion due to the applied loading.

Referring to FIG. 5, in another embodiment, a frame portion 114 has a substantially planar first portion 114a, and wall portions 114b rigidly coupled to and extending from opposite ends of (and out of a plane of) the first portion 114a. Each of wall portions 114b includes and terminates in a second portion 114c configured for attachment to another element of the joint structure by welding or any other suitable method. In the embodiment shown in FIG. 5, first portion 114a and wall portions 114b are formed integral with each other. However, these elements of the frame portion may alternatively be formed from separate parts which are rigidly coupled together.

In addition, at least a pair of reinforcing walls 114x and 114w is attached to first portion 114a, using welding or any other suitable attachment method. walls 114x and 114w are also configured to enable attachment to first reinforcement 18 using welding or any other suitable attachment method, after the first reinforcement is positioned in contact with frame portion second portions 114c, thereby forming a reinforced frame structure. Walls 114x and 114w may be formed from a metallic material (such as steel or aluminum) or any other suitable material or combination of materials. After (or before) connecting the elements of the cross-section as described above, openings 18a and 114e may be drilled or otherwise formed permitting the insertion therein of bolt 30 or another element of a suitable load transmission means, as previously described.

In some additional embodiments, one or more of the first portion, the wall portions, the first reinforcement, second reinforcements, and any additional reinforcements or elements of the frame structure are formed integrally with each other and as a single piece with the structure of the frame portion, by forming an extrusion having a cross-sectional configuration incorporating the desired features. These integrally-formed elements of the frame structure perform the same functions as the corresponding separately-formed elements of the frame structure described herein. Also, additional walls or reinforcing elements may be formed into or otherwise added to the joint structure, if desired.

Referring to FIG. 6, in a particular embodiment, a first reinforcement 118, first portion 114a, wall portions 114b, and additional reinforcements 114x and 114w are formed integrally with each other and with the frame portion incorporated into the joint, by forming an extrusion having the cross-sectional configuration shown. This extrusion may be formed from aluminum or any other suitable material. After the extrusion is formed, openings 118e and 114e are drilled or otherwise formed permitting the insertion therein of bolt 30 or another element of a suitable load transmission means, as previously described. In an embodiment where the load transmission means includes a caged nut, the cage may be secured to the first reinforcement 18, 118 as previously described prior to insertion of the bolt 30 into the joint.

Referring to FIG. 7, in another embodiment, a frame portion 214 has a substantially planar first portion 214a, wall portions 214b rigidly coupled to and extending from opposite ends of (and out of a plane of) the first portion 214a. Each of wall portions 214b includes and terminates in a second portion 214c configured for attachment to another element of the joint structure by welding or any other suitable method. In the embodiment shown in FIG. 7, first portion 214a and wall portions 214b are formed integral with each other. However, these elements of the frame portion may alternatively be formed from separate parts which are rigidly coupled together.

In addition, one or more reinforcing wall(s) 214x are attached to first portion 214a, using welding or any other suitable attachment method. Wall(s) 214x are also configured to enable attachment to first reinforcement 18 using welding or any other suitable attachment method, after the first reinforcement is positioned in contact with frame portion second portions 214c, thereby forming the reinforced joint structure. Wall(s) 214x may be formed from a metallic material (such as steel or aluminum) or any other suitable material or combination of materials. After connecting the elements of the cross-section as described above, openings 18e and 214e may be drilled or otherwise formed permitting the insertion therein of bolt 30 or another element of a suitable load transmission means, as previously described.

Figure 8:
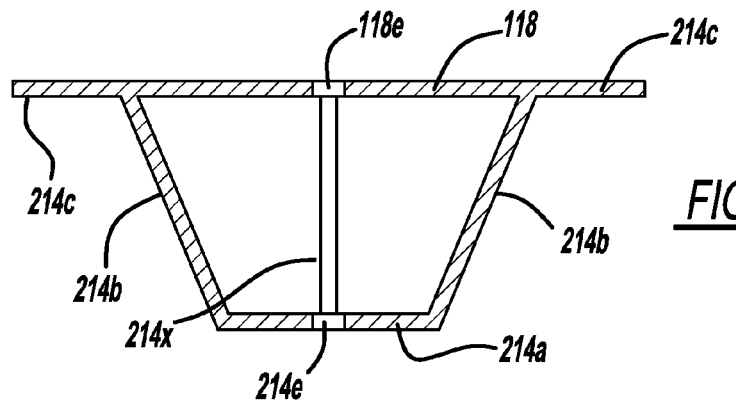
FIG. 8 is a cross-sectional view of a reinforced frame structure in accordance with another embodiment of the present invention.

Referring to FIG. 8, in a particular embodiment, first reinforcement 118, additional reinforcement(s) 214x, first portion 214a, and wall portions 214b are formed integrally with each other, into a single piece with the frame portion incorporated into the joint, by forming an extrusion having the cross-sectional configuration shown. This extrusion may be formed from aluminum or any other suitable material. After the extrusion is formed, openings 118e and 214e are drilled or otherwise formed permitting the insertion therein of bolt 30 or another element of a suitable load transmission means, as previously described. In an embodiment where the load transmission means includes a caged nut, the cage may be secured to the first reinforcement 18, 118 as previously described prior to insertion of the bolt 30 into the joint.

Figure 9:
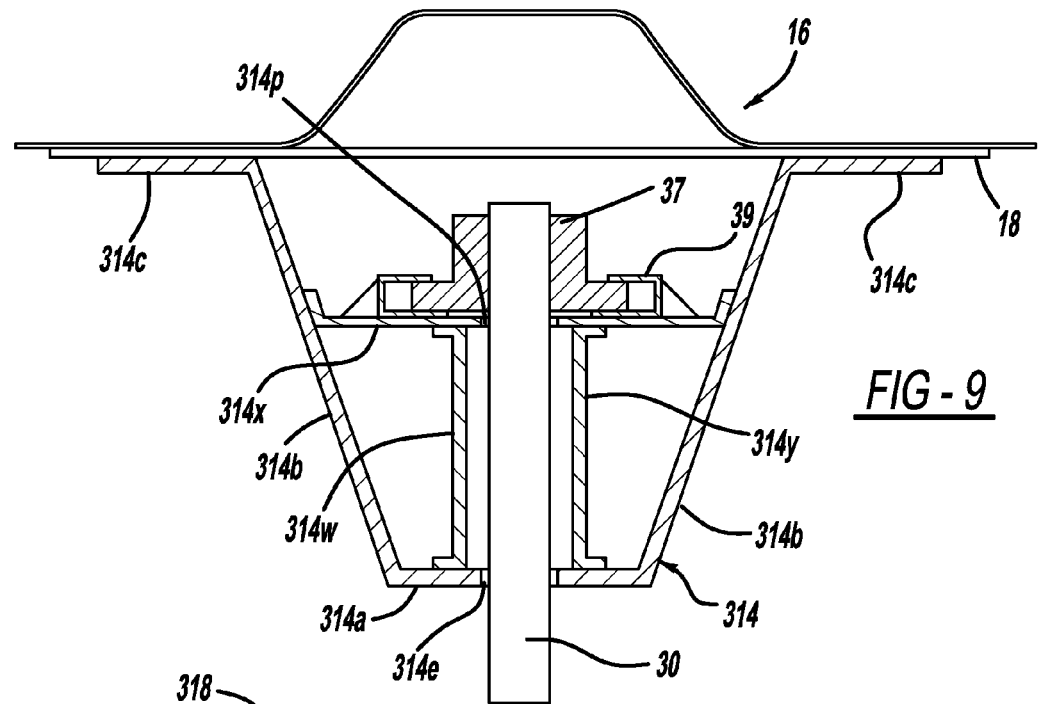
FIG. 9 is a cross-sectional view of a reinforced frame structure in accordance with another embodiment of the present invention.

Referring to FIG. 9, in another embodiment, a frame portion 314 has a substantially planar first portion 314a, wall portions 314b rigidly coupled to and extending from opposite ends of (and out of a plane of) the first portion 314a. Each of wall portions 314b includes and terminates in a second portion 314c configured for attachment to another element of the joint structure by welding or any other suitable method. In the embodiment shown in FIG. 9, first portion 314a and wall portions 314b are formed integral with each other. However, these elements of the frame portion may alternatively be formed from separate parts which are rigidly coupled together.

In addition, at least three reinforcing walls 314x, 314w, and 314y are incorporated into the frame portion using welding or any other suitable attachment method. Wall 314x has an end secured to each of wall portions 314b between first portion 314a and second portions 314c. Walls 314w and 314y extend between wall 314x and frame first portion 314a, and are secured to wall 314x and first portion 314a. Walls 314x, 314w, and 314y may be formed from a metallic material (such as steel or aluminum) or any other suitable material or combination of materials. After the elements are connected as described to form the reinforced cross-section, openings 314p and 314e may be drilled or otherwise formed permitting the insertion therein of bolt 30 or another element of a suitable load transmission means, as previously described.

Figure 10:
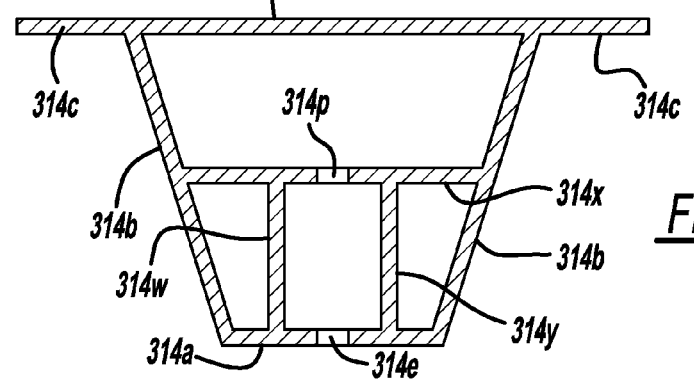
FIG. 10 is a cross-sectional view of a reinforced frame structure in accordance with another embodiment of the present invention.

Referring to FIG. 10, in another particular embodiment, first portion 314a, wall portions 314b, a first reinforcement 318, and reinforcements 314x, 314w, and 314y are formed integrally with each other and as a single piece with the structure of the frame portion incorporated into the joint, by forming an extrusion having the cross-sectional configuration shown. This extrusion may be formed from aluminum or any other suitable material. After the extrusion is formed, openings 314p and 314e are drilled or otherwise formed permitting the insertion therein of bolt 30 or another element of a suitable load transmission means, as previously described. In an embodiment where the load transmission means includes a caged nut, the cage may be secured to the first reinforcement 18, 318 as previously described prior to insertion of the bolt 30 into the joint.

Figure 11:
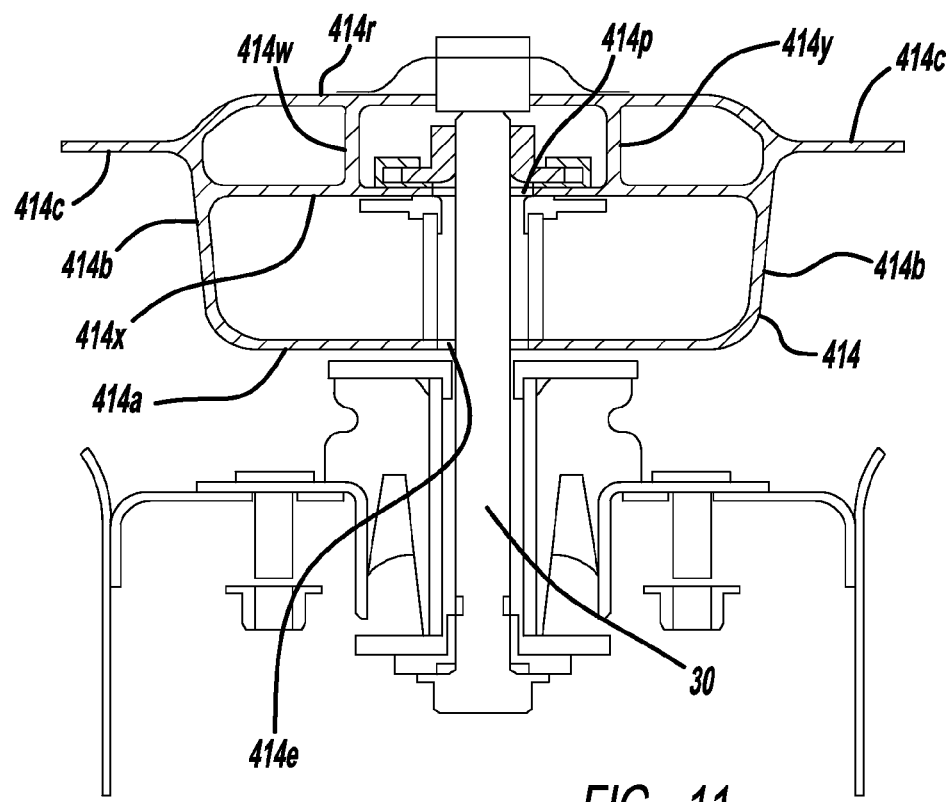
FIG. 11 is a cross-sectional view of a reinforced frame structure in accordance with another embodiment of the present invention.
Figure 12:
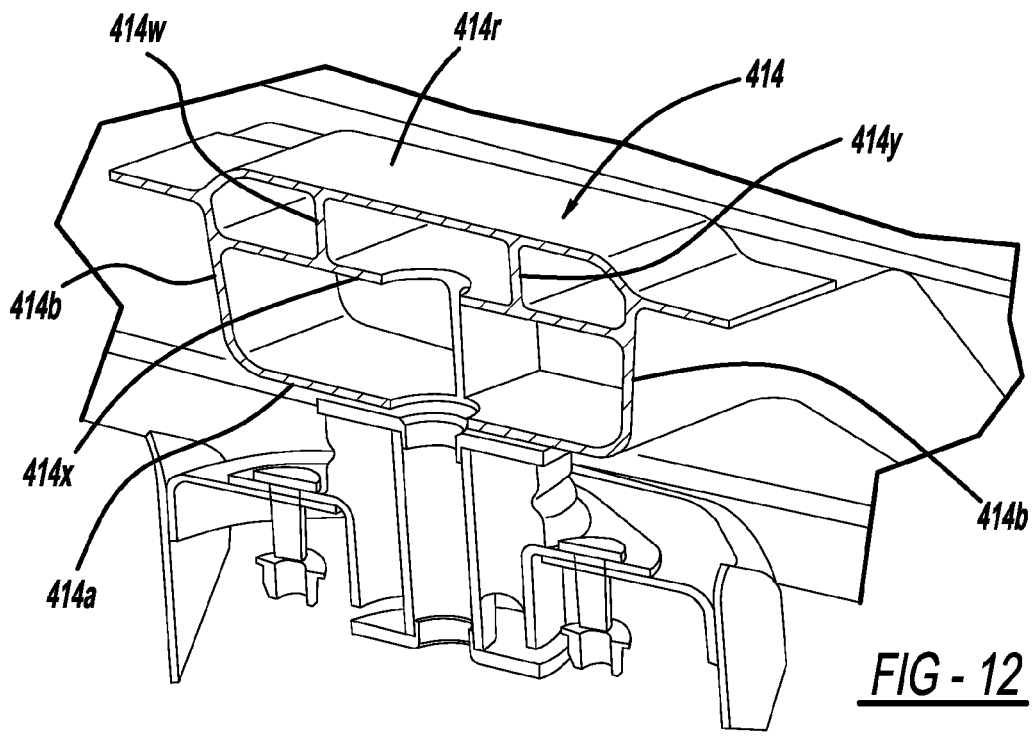
FIG. 12 is a cross-sectional perspective view of the reinforced frame structure shown in FIG. 11.

Referring to FIGS. 11 and 12, in another embodiment, a frame portion 414 has a substantially planar first portion 414a, wall portions 414b rigidly coupled to and extending from opposite ends of (and out of a plane of) the first portion 414a. Each of wall portions 414b includes and terminates in a second portion 414c configured for attachment to another element of the joint structure by welding or any other suitable method. In the embodiment shown in FIGS. 11 and 12, first portion 414a and wall portions 414b are formed integral with each other. However, these elements of the frame portion may alternatively be formed from separate parts which are rigidly coupled together.

A first reinforcing wall 414r extends between (and is attached to) ends of wall portions 414b. A second reinforcing wall 414x has an end secured to each of wall portions 414b between first portion 414a and second portions 414c, using welding or any other suitable attachment method. Additional walls 414w and 414y extend between first wall 414r and second wall 414x, and are secured to walls 414x and 414r using welding or any other suitable attachment method. Walls 414x, 414r, 414w, and 414y may be formed from a metallic material (such as steel or aluminum) or any other suitable material or combination of materials.

After the elements are connected as described to form the reinforced cross-section, openings 414p and 414e are drilled or otherwise formed permitting the insertion therein of bolt 30 or another element of a suitable load transmission means, as previously described.

Referring to FIG. 12, in a particular embodiment, first portion 414a, wall portions 414b, and walls 414x, 414r, 414w, and 414y are formed integrally with each other and as a single piece with the structure of the frame portion incorporated into the joint, by forming an extrusion having the cross-sectional configuration shown. This extrusion may be formed from aluminum or any other suitable material.

After the extrusion is formed, openings 414p and 414e are drilled or otherwise formed permitting the insertion therein of bolt 30 or another element of a suitable load transmission means, as previously described.

It will be understood that the foregoing description of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

What is claimed is:

1. A frame structure for a vehicle, comprising:
   a frame portion; and
   a reinforcement including a planar first portion, a pair of wall portions extending from the first portion and out of a plane of the first portion, and a second portion extending from each wall portion of the pair of wall portions, wherein the second portions are coplanar, and wherein the frame portion is rigidly coupled to the reinforcement along the second portions, and
   wherein the frame portion and reinforcement combine to define an enclosure, the frame structure further comprising an annular spacer having a first end positioned within the enclosure, and a second end opposite the first end and positioned within the enclosure.

2. The frame structure of claim 1 further comprising another reinforcement interposed between the frame portion and the reinforcement and rigidly coupled to the reinforcement and to the frame portion between the reinforcement second portions and the frame portion.

3. A frame structure for a vehicle, comprising:
   a frame portion; and
   a reinforcement including a planar first portion, a pair of wall portions extending from the first portion and out of a plane of the first portion, and a second portion extending from each wall portion of the pair of wall portions, wherein the second portions are coplanar, and wherein the frame portion is rigidly coupled to the reinforcement along the second portions;
   the frame structure further comprising another reinforcement interposed between the frame portion and the reinforcement and rigidly coupled to the reinforcement and to the frame portion between the reinforcement second portions and the frame portion,
   wherein the reinforcement and the other reinforcement combine to define a cavity therebetween, and wherein the frame structure further comprises a spacer enclosed within the cavity and abutting the reinforcement and the other reinforcement.

4. The frame structure of claim 1 wherein a second portion extends along a first direction from a first wall portion of the pair of wall portions, and another second portion extends from a second wall portion of the pair of wall portions along a second direction opposite the first direction.

5. The frame structure of claim 3 wherein the other reinforcement has a first portion and a pair of wall portions extending therefrom, each wall portion extending from the frame portion to the reinforcement, and wherein the frame portion and the other reinforcement first portion are directly and rigidly connected to each other.

6. The frame structure of claim 1 further comprising an opening formed in the reinforcement and configured for receiving a portion of a load transmission means therethrough.

7. A vehicle including a frame structure in accordance with claim 1.

8. A frame-to-body joint structure for a vehicle, comprising:
   a frame portion;
   a reinforcement rigidly coupled to the frame portion; and
   another reinforcement interposed between the frame portion and the reinforcement, the other reinforcement including a planar first portion, a pair of wall portions extending from the first portion and out of a plane of the first portion, and a second portion extending from each wall portion of the pair of wall portions, wherein the other reinforcement second portions are coplanar, and wherein the frame portion and the reinforcement are rigidly coupled to the other reinforcement along the other reinforcement second portions,
   wherein the frame portion includes a planar first portion, a pair of wall portions extending from the first portion and out of a plane of the first portion,
   and wherein the other reinforcement wall portions are spaced apart from the frame portion wall portions.

9. A vehicle including a frame structure in accordance with claim 3.

10. The joint structure of claim 8 wherein the reinforcement includes a planar first portion, a pair of wall portions extending from the first portion and out of a plane of the first portion, and a second portion extending from each wall portion of the pair of wall portions, wherein the reinforcement second portions are coplanar, and wherein the other reinforcement second portions are rigidly coupled to the reinforcement along the reinforcement second portions.

11. The joint structure of claim 10 wherein the other reinforcement wall portions are spaced apart from the reinforcement wall portions.

12. A frame-to-body joint structure for a vehicle, comprising:
   a frame portion;
   a reinforcement rigidly coupled to the frame portion; and
   another reinforcement interposed between the frame portion and the reinforcement, the other reinforcement including a planar first portion, a pair of wall portions extending from the first portion and out of a plane of the first portion, and a second portion extending from each wall portion of the pair of wall portions, wherein the other reinforcement second portions are coplanar, and wherein the frame portion and the reinforcement are rigidly coupled to the other reinforcement along the other reinforcement second portions, wherein the reinforcement includes a planar first portion, a pair of wall portions extending from the first portion and out of a plane of the first portion, and a second portion extending from each wall portion of the pair of wall portions, wherein the reinforcement second portions are coplanar, and wherein the other reinforcement second portions are rigidly coupled to the reinforcement along the reinforcement second portions, the joint structure further comprising a spacer having a first end and a second end opposite the first end, wherein the first and second ends are positioned between the reinforcement first portion and the other reinforcement first portion.

13. The joint structure of claim 10 wherein the frame portion includes a planar first portion, a pair of wall portions extending from the first portion and out of a plane of the first portion, and a second portion extending from each wall portion of the pair of wall portions, wherein the frame portion second portions are coplanar, and wherein the frame portion second portions, the reinforcement second portions, and the other reinforcement second portions abut each other and are rigidly coupled to each other therealong.

14. A vehicle including a joint structure in accordance with claim 8.

15. The frame structure of claim 8 wherein the frame portion includes a second portion extending from each wall portion of the pair of wall portions, wherein the frame portion second portions are coplanar, and wherein the frame portion second portions and the reinforcement second portions abut each other and are rigidly coupled to each other therealong.

16. A vehicle including a joint structure in accordance with claim 12.

* * * * *